United States Patent [19]

Funaki et al.

[11] Patent Number: 4,679,775
[45] Date of Patent: Jul. 14, 1987

[54] VIBRATION DAMPING EQUIPMENT

[75] Inventors: Takashi Funaki, Tokyo; Katsuto Nakatsuka, Sendai, both of Japan

[73] Assignee: Yakumo Industrial Corporation, Tokyo, Japan; a part interest

[21] Appl. No.: 652,633

[22] Filed: Sep. 20, 1984

[51] Int. Cl.$^4$ .............................................. F16F 9/04
[52] U.S. Cl. ............................. 267/64.27; 188/267; 267/64.15
[58] Field of Search .................. 188/267; 267/64.15, 267/64.27, 136

[56] References Cited

U.S. PATENT DOCUMENTS

| 2,654,009 | 9/1953 | Trembley et al. | 188/267 X |
| 2,906,899 | 9/1959 | Geneslay | 188/267 X |
| 2,973,969 | 3/1961 | Thall | 188/267 X |
| 3,174,587 | 3/1965 | Walton | 188/267 |
| 4,351,515 | 9/1982 | Yoshida | 267/136 X |

FOREIGN PATENT DOCUMENTS

| 935831 | 12/1955 | Fed. Rep. of Germany | 188/267 |
| 2103152 | 7/1972 | Fed. Rep. of Germany | 267/64.27 |
| 3126470 | 1/1983 | Fed. Rep. of Germany | 188/267 |
| 1094516 | 12/1904 | France | 188/267 |
| 1238047 | 6/1960 | France | 188/267 |

Primary Examiner—George E. A. Halvosa
Attorney, Agent, or Firm—Wenderoth, Lind & Ponack

[57] ABSTRACT

A vibration damping apparatus utilizing the phenomenon of an apparent viscosity created by the combination of a magnetic body and a magnetic fluid due to the magnetic fields of the magnetic fluid. The apparatus is a piston system, including an inner cylinder formed of a magnetic body accommodated within an outer cylinder formed of a nonferrous material. A passage of suitable dimensions is defined between the outer peripheral surface of the inner cylinder and the inner peripheral surface of the outer cylinder. A magnetic fluid is stored within the outer cylinder. The inner cylinder is firmly secured at its upper face to a supporting shaft formed of a nonferrous material. The supporting shaft is provided at its upper end with an upper frame for suitable devices through a planar plate when the apparatus is used as a vibration proofing frame. Likewise, lower frame is arrange under the lower face of the outer cylinder portion.

17 Claims, 10 Drawing Figures

VIBRATION DAMPING EQUIPMENT

BACKGROUND OF THE INVENTION

This invention relates to a vibration damping apparatus comprising a skillful combination of a solid magnetic body and a magnetic fluid, and more particularly to a vibration damping apparatus which can be used in various industrial fields requiring a vibration damping by utilizing the increased phenomenon of an apparent viscosity created by combination of said magnetic body and magnetic fluid due to magnetic fields in said magnetic fluid.

Heretofore, there have been various kinds of apparatus for damping vibration, including the one in the form of a spring mechanism as a typical example. However, in the prior art damping equipment, there is a disadvantage that since the elastic structural portions within the various kinds of damping apparatus are formed with as much elasticity as possible in order to meet with the necessity to further increase the vibration proofing effect, the vibration to be damped is apt to remain in said elastic structural portions themselves permanently, which results in the deterioration of the vibration damping efficiency. Furthermore, in the various conventional damping apparatus, since the vibration generating sources and the vibration damping structural portions are normally in contact with each other, there is such an inconvenience that the vibration properly induced is transmitted to the structural portions themselves adapted to damp the vibration, so that the structural portions themselves become the vibration mediums.

Therefore, an important problem yet to be solved in the prior art is how to remove the above-mentioned disadvantage and inconvenience, while improving the vibration damping ratio.

OBJECT OF THE INVENTION

The present invention was accomplished in view of the above. It is therefore a general object of the invention to provide a vibration damping apparatus wherein the abovementioned disadvantage and inconvenience are completely removed, and simultaneously various kinds of induced vibrations are instantly damped with high efficiency, while maintaining a desirable vibration damping ratio.

DETAILED DESCRIPTION OF THE PREFERRED EMBODIMENTS

Reference is first made to FIGS. 1 through 4. Although it should be understood that the structure of the present invention is not limited to this, when the apparatus of the invention is constructed of, e.g., a piston system, an inner cylindrical portion 2 formed of a magnetic body is accommodated within an outer cylindrical portion 1 formed of a nonferrous material. A passage portion 3 of suitable dimensions is defined between the outer peripheral surface of said inner cylindrical portion 2 and the inner peripheral surface of said outer cylindrical portion 1. A magnetic fluid 4 is stored within said outer cylindrical portion 1. The inner cylindrical portion 2 is firmly secured at its upper face to a supporting shaft portion 5 for supporting the inner cylindrical portion 2 formed of a nonferrous material. The supporting portion 5 is provided at its upper portion with an upper frame 15 for suitable devices or the like through a suitable planar plate portion 6, when the present equipment is used as, e.g., a vibration proofing frame as will be described hereinafter. Likewise, a lower frame 16 is arrange under the lower face of said outer cylindrical portion 1.

As shown in the drawing as an example, the magnetic bodies constituting said inner cylindrical portion 2 is constructed of a plurality of magnetic bodies 11 piled up in several layers through spacers 12 formed of a nonmagnetic material such as an acrylic, the respective magnetic bodies 11 being continuously fixed with respect to each other with the same poles facing each other and with spacers 12 each interposed between the adjacent magnetic bodies 11. The inner cylindrical portion 2 constructed as mentioned in the foregoing creates the following state of magnetic fields on the outer peripheral surface. That is, since the respective magnetic bodies 11 are continuously arranged in such a manner that the same poles of adjacent magnetic bodies face each other, magnetic fields 13 are produced respectively as shown in dotted lines in FIG. 2. The largest and most intensified magnetic fields 14 (black points in FIG. 2) are produced at locations opposite the respective spacers 12 interposed between the magnetic bodies. The smallest magnetic fields are produced at the center of the respective magnetic bodies 11. In this case, although not specifically shown in the drawing, if said magnetic bodies 11 should be arranged to face the opposite poles of adjacent magnetic bodies 11, extremely large magnetic fields would be obtained at the upper and lower portions of the inner cylindrical portion 2 formed of magnetic bodies. However, only very small magnetic fields would be obtained on the outer peripheral side surface of the inner cylindrical portion. It should be understood that the arrangement and combination of the respective magnetic bodies 11 forming the inner cylindrical portion 2 are not limited to the example shown in the drawing, but various arrangements and combinations can be worked out.

Figure 1:
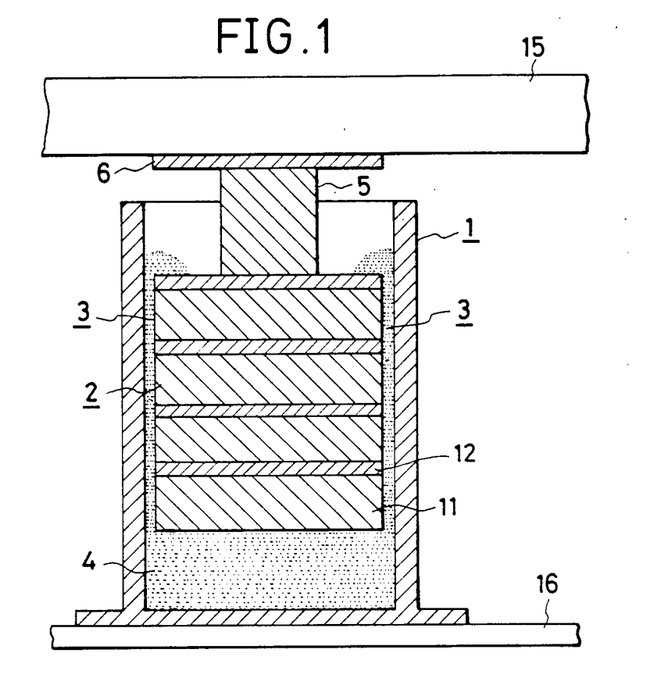
FIG. 1 is a vertical cross-sectional view of a first fundamental embodiment embodying the present invention in the structure of a piston system.
Figure 2:
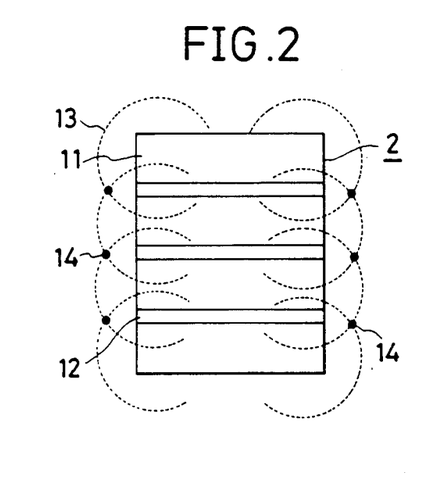
FIG. 2 is a front view of the magnetic body of FIG. 1.

With the above constitution of the present invention, the magnetic fluid 4 flowing through the narrow passage 3 defined between the inner peripheral surface of the outer cylindrical portion 1 and the outer peripheral surface of the inner cylindrical portion 2 can be added with the magnetic fields in a considerably effective manner, while avoiding the formation of extremely uneven magnetic fields due to the continuous arrangement of the respective magnetic bodies 11. Furthermore, the apparent viscosity of the magnetic fluid 4 can be further increased by the magnetic fields 14. The apparent viscosity of the magnetic fluid 4 can be easily adjusted by means of changing the thickness of the viscosity of said magnetic fluid by condensing or diluting the magnetic fluid 4 itself.

In this way, according to the present invention, as the inner cylindrical portion 2 moves up and down, the magnetic fluid 4 flows through the narrow passage 3 while yielding a velocity gradient. Consequently, a pressure difference is created in proportion to the average velocity of the flow on the upper face and the lower face of the inner cylindrical portion 2. As a result, a damping force is produced, thereby causing the aforementioned damping force to become even larger. The free vibration induced can be immediately damped by using this damping force. Furthermore, according to the present invention, by combining the magnetic fluid 4 with the respective magnetic bodies 11 as mentioned above, in the foregoing manner, the damping force itself depending on the elastic property of the magnetic fluid 4 and the space of the passage portion 3 added with an even larger damping effect by increasing the apparent viscosity of the magnetic fluid 4 due to the intensified magnetic fields 14, and the vibration induced is damped instantly at a high efficient ratio. The damping force, as briefly mentioned above, can be easily adjusted by changing the density of the magnetic fluid 4 stored within the outer cylindrical portion 1. When an even greater damping force is required, it can be increased by either increasing the layers of the magnetic bodies 11 forming the inner cylindrical portion 2 or arranging a plurality such apparatus in parallel since the apparent viscosity is increased in proportion to the intensity of the magnetic field acting on the magnetic material of the magnetic fluid 4.

On the other hand, in addition to the fact that the present invention has the particularly excellent damping effect as mentioned in the foregoing, it also has such character that due to the arrangement of the inner cylindrical portion 2 formed of the magnetic bodies 11 piled up in several layers in the magnetic fluid 4 and also due to the loops of intensified magnetic fields 14 generated on the outer peripheral side surface of the inner cylindrical portion 2, the inner cylindrical portion 2 is always centered without contacting the inner peripheral surface of the outer cylindrical portion 1 at all. Consequently, this apparatus can be referred to, in a sense, as a non-contact type damping structure. Therefore, unlike the prior art, such difficulties that the respectively contacted structural portions themselves become vibration mediums can be completely eliminated.

The first embodiment shown as a structural example as well as a use example of the present invention in FIGS. 1 through 4 is constructed of a piston system and the use thereof is directed to a vibration proofing frame for suitable devices, etc. In the drawings, the upper frame 15 is supported by springs 17 on a lower frame 16 and the present apparatus is positioned therebetween. Consequently, when the damping apparatus according to present invention is used as such a vibration proofing frame, the apparatus itself will never become a vibration medium and the free vibration induced by either the upper frame 15 or the lower frame 16 can be immediately damped by obtaining a damping constant in advance in view of the resonant frequency of the vibration proofing frames and by preparing the magnetic fluid 4 in suitable density or the like.

It should be understood that the use of the present invention is not limited to the above-mentioned use example. Instead, it can be used for vibration damping in various fields.

Now, referring to FIGS. 5 through 7, a second embodiment of the present invention will be described. For convenience, description will be made on a piston type system shown in the drawings. However, it should be understood that the structure itself of the present invention is not limited to the piston type.

The apparatus according to the present invention comprises an outer cylindrical portion 108 formed of a nonmagnetic material, a ring shaped cylindrical portion 106 formed of magnetic bodies 104 positioned on the inner periphery of the outer cylindrical portion 108, an inner cylindrical portion 102 formed of a nonmagnetic material, positioned within said ring shaped cylindrical portion 106 in such manner as to define a passage portion 103 of suitable dimensions between the outer peripheral surface of said inner cylindrical portion 102 and the inner cylindrical surface of said ring shaped cylindrical portion 106; and a magnetic fluid 107 stored within said outer peripheral portion 108. A shaft portion 101 formed of a nonmagnetic material is connected to the upper portion of said inner cylindrical portion 102. On the upper end portion of said shaft portion 101 an upper frame 121 for suitable devices, etc. is provided through, for example, a suitable planar plate portion 109, when the present apparatus is used with a variation proofing frame for a suitable device, etc. as will be described hereinafter, and a lower frame 122 is provided on the undersurface of said outer cylindrical portion 108.

The ring shaped cylindrical portion 106 is constructed in such a manner that the plurality of magnetic bodies 104 are piled up in several layers through respective spacers 105 formed of a nonmagnetic material or a suitable magnetic material of an acrylic or the like, said respective magnetic bodies 104 being continuously provided in a manner with the same poles of adjacent magnetic bodies facing each other and with the respective spacers 105 disposed between the adjacent magnetic bodies. However, in the present invention, the arrangement and combination of the respective magnetic bodies 104 forming the ring shaped cylindrical portion 106 can be made in various ways and it should not be limited to the example shown in the drawings. For example, as shown in FIG. 7, spacers 105' formed of a suitable magnetic material may be arranged in a manner as to be disposed to overlap suitable radial widths of the magnetic bodies 104 from between the respective magnetic bodies 104.

With the above constitution, the apparatus according to the present invention can create the following state of magnetic fields on the inner peripheral surface of the ring shaped portion 106 or in the passage portion 103. That is, since the respective magnetic bodies 104 are continuously provided in a manner with the same poles of adjacent magnetic bodies facing each other through the respective spacers 105, respective magnetic fields are generated in the ring shaped cylindrical portion 106 as shown in dotted lines in FIG. 6. Loops of largest and most intensified magnetic fields 111 (black points in FIG. 6) are produced at the side portion of the spacers 105 interposed and the smallest magnetic fields are produced at the center of the respective magnetic bodies 104. When the ring shaped cylindrical portion 106 is constituted as shown in FIG. 7, even more intensified magnetic fields 111 are obtainable. In this case, although not specifically shown, if said magnetic bodies are arranged with opposite poles of adjacent magnetic bodies facing each other, extremely large magnetic fields are obtained at the upper and lower end portions of the ring shaped cylindrical portion 106. However, only very small magnetic fields are obtained on the outer peripheral surface of the ring shaped cylindrical portion 106. Consequently, in the apparatus of the present invention, the magnetic fluid 107 flowing through the passage 103 defined between the inner peripheral surface of the ring shaped cylindrical portion 106 and the outer peripheral surface of the inner cylindrical portion 102 are added with the magnetic fields 111 in a considerably effective manner while avoiding the formation of extremely uneven magnetic fields due to the continuous arrangement of the respective magnetic bodies 104 forming the ring shaped cylindrical portion 106. Furthermore, the apparent viscosity of the magnetic fluid 107 can be further increased by the magnetic fields 111. The apparent viscosity of the magnetic fluid 107 can be easily adjusted by means of changing the degree of viscosity of said magnetic fluid 107 by condensing or diluting the magnetic fluid 107 itself.

In the present apparatus, since the magnetic fluid 107 is always kept in a state readiness to be attracted by the ring shaped cylindrical portion 106 formed of magnetic bodies 104, even in such a case that, for example, the inner cylindrical portion 102 is removed from the present apparatus, said magnetic fluid is normally maintained in the present apparatus and never leaks out of the apparatus.

Figure 5:
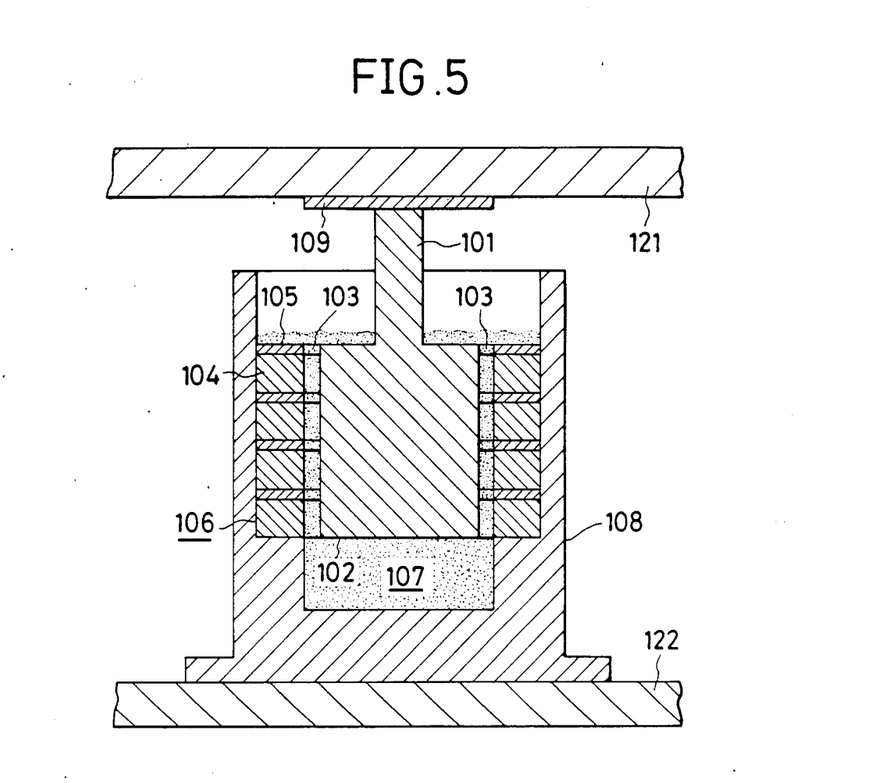
FIG. 5 is a front vertical sectional view of the second embodiment of the present invention.
Figure 6:
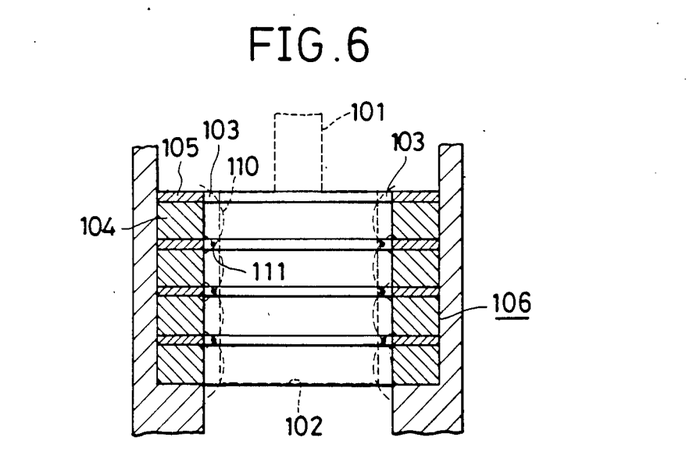
FIG. 6 is a side vertical sectional view of the embodiment in FIG. 5.
Figure 7:
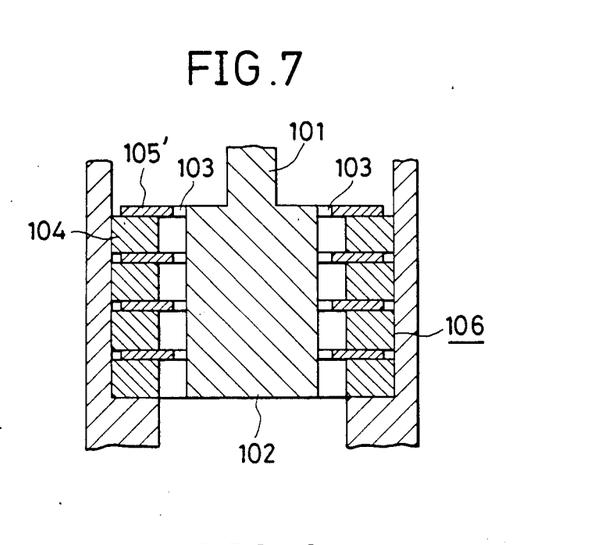
FIG. 7 is a side view of a ring shaped cylindrical portion of another embodiment.

In the piston type damping apparatus embodying the present invention as shown in FIGS. 5 through 7, as the inner cylindrical portion moves up and down according to the vibration of suitable devices etc. which are positioned on the upper frame 121 and become vibration generating sources, the magnetic fluid 107 flows through the passage portion 103 with some velocity gradient. Consequently, a pressure difference is created in proportion to the average velocity of the flow on the upper face and the lower face of the inner cylindrical portion of 102. As a result, a further damping force is produced, thereby causing said overall damping force to become even larger. The free vibration induced can be immediately damped by using this damping force. Furthermore, according to the present invention, by combining the magnetic fluid 107 with the respective magnetic bodies 104 as mentioned, in the foregoing manner, the damping force itself depending on the elastic property of the magnetic fluid 107 and the dimensions of the passage portion 103 is added with an even larger damping effect by increasing the apparent viscosity of the magnetic fluid 107 due to the intensified magnetic fields 111, and the vibration induced is damped instantly at a high efficiency ratio.

This damping force, as mention above, can be easily adjusted by changing the density of the magnetic fluid 107 accommodated in the outer cylindrical portion 108. When an even greater damping force is required, the damping force can be increased by either increasing the layers of the magnetic bodies 104 forming the ring shaped cylindrical portion 106 or arranging the present a plurality of apparatuses of invention in parallel.

On the other hand, in addition to the fact that the present invention has a particularly excellent damping effect as mentioned in the foregoing, it also has such character that due to the arrangement of the ring shaped cylindrical portion 106 formed of the magnetic bodies 104 piled up in several layers in the magnetic fluid 107 and also due to the intensified magnetic fields 111 generated on the inner peripheral side surface of the ring shaped cylindrical portion 106, the inner cylindrical portion 102 is always centered without contacting the inner peripheral surface of the ring shaped cylindrical body 106 at all. Consequently, this apparatus can be characterized, in a sense, as a non-contact type damping structure. Therefore, unlike the prior art referred to in the foregoing, the difficulty that the respectively contacted structural portions themselves become vibration mediums can be completely eliminated.

Figure 3:
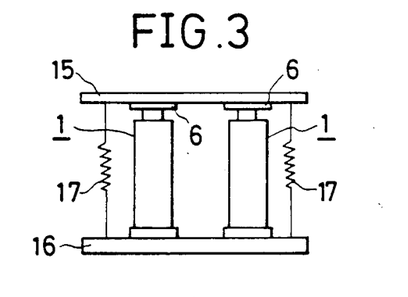
FIG. 3 is a side view schematically illustrating a vibration frame, to which the present invention is applied.
Figure 4:
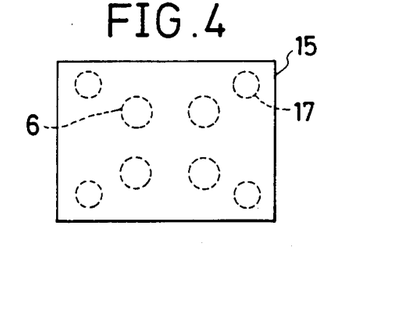
FIG. 4 is a plane view of the above.

The second embodiment shown as a struuctural example as well as a use example of the apparatus of FIGS. 5 through 7 is a piston system and the use thereof is directed to a vibration proofing frame for suitable devices, etc. The upper frame shown in FIG. 5 is supported by a spring portion 17 on a lower frame 122 as shown in FIG. 3, and the present apparatus is positioned therebetween. Consequently, when the damping apparatus according to the present invention is used as such a vibration proofing frame, the apparatus itself will never become a vibration medium and the free vibration induced by either the upper frame 121 or the lower frame 122 can be immediately damped by defining a damping constant in advance in view of the resonant frequency of the vibration proofing frames and by preparing the magnetic fluid 107 in suitable density, etc.

It should be understood that the use of the present invention is not limited to the above-mentioned use example. Instead, it can be used for vibration damping in various fields.

Figure 8:
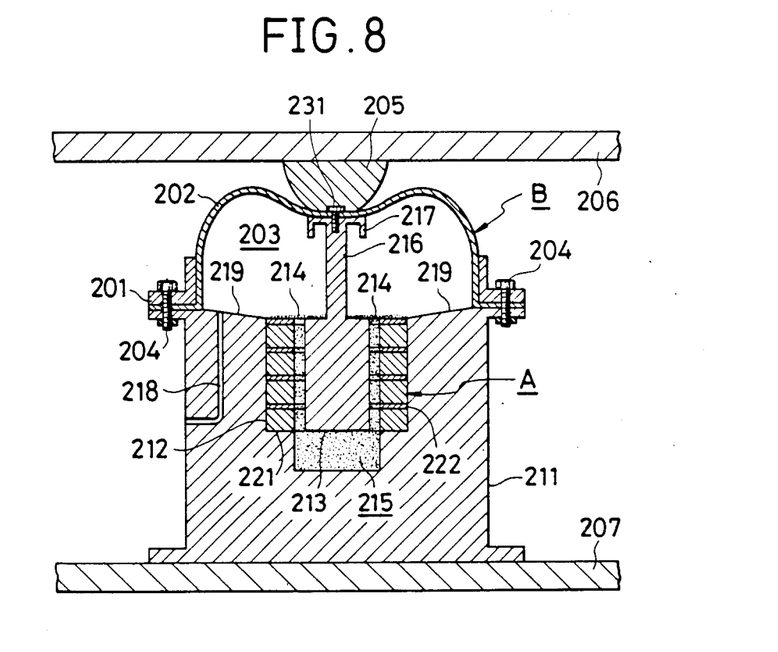
FIGS. 8 and 9 are vertical sectional view of embodiments of the present invention.
Figure 9:
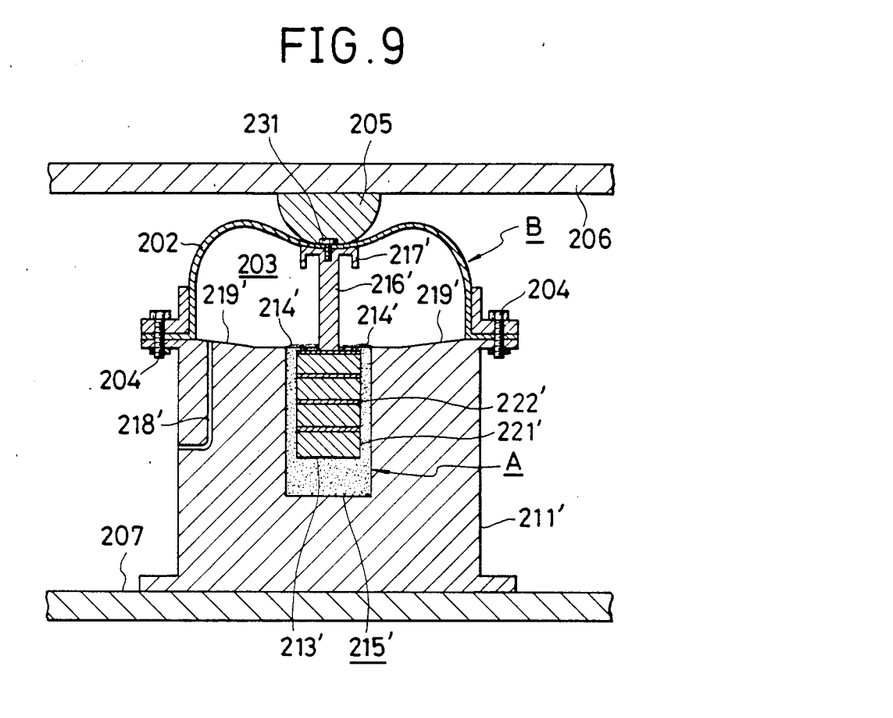
Figure 10:
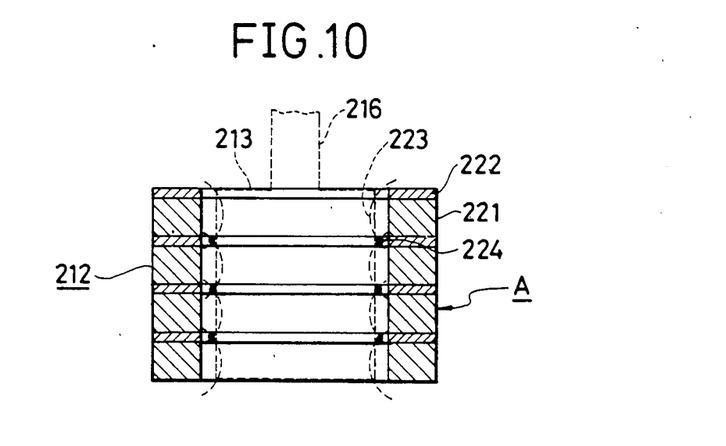
FIG. 10 is a vertical sectional view of an element of the embodiments of FIGS. 8 and 9.

Now, referring to FIGS. 8 through 10, the third embodiment of the present apparatus comprises a vibration damping structure (A) and an elastic body (B). Structure (A) is characterized in that a large damping force is created by increasing the apparent viscosity of a magnetic fluid while generating intensified magnetic fields and various kinds of inuced free vibrations are immediately damped by said large damping force and simultaneously the transient characteristics as well as phase characteristics are much favourably improved and furthermore, the apparatus itself is formed in a damping structure of a completely non-contact system. The elastic structural body (B) has a substantial spring characteristic provided by some suitable means including, for example, an air spring system and contains said structural body (A). The elastic structural body (B) can be constituted in any way as long as it has a spring portion which as much as possible by suitable means furthers the vibration proofing function of the apparatus. Specifically, for example, an air spring system may be employed as said spring portion. One embodiment shown in FIG. 8 through 10 uses an elastic structural body (B), wherein an air chamber is defined by a spring portion 202 formed of an elastic rubber material supported at its lower end by side frames 201 formed of a suitable steel material. In FIGS. 8 and 9, the numeral 204 denotes a fastening member fastening tightly a side frame 201 and a spring portion 202. Numeral 205 denotes a connecting member connecting an upper frame 206 for positioning suitable devices, etc. (not shown) and the spring portion 202, said frame 206 being arranged at the center of the spring portion 202.

On the other hand, said vibration damping structural body (A) is constituted such that a ring shaped cylindrical portion 212 is provided at the inner periphery of the fundamental outer cylindrical portion 211 formed on a non-magnetic material and an inner cylindrical portion 213 formed of a nonmagnetic material is provided within the ring shaped portion of said ring shaped cylindrical portion 212, while a passage portion 214 of suitable dimensions is defined between the outer peripheral surface of said inner cylindrical portion 213 and the inner peripheral surface of the ring shaped cylindrical portion 212, a magnetic fluid 215 being stored within said fundamental outer cylindrical portion 211. A shaft portion 216 formed of a nonmagnetic material is fixedly provided at the upper portion of said inner cylindrical portion 213. A suitable planar plate portion 217 is fixedly secured to the upper end of said shaft portion 21, the upper face thereof being continuously provided at the inner center of said spring portion 202 by a fastening portion 231. In FIGS. 8 and 9, numeral 218 denotes a pipe portion for supplying and discharging air to and from said air chamber 203, and numeral 219 denotes a slant portion formed on the upper end of the cylindrical portion of the fundamental outer cylindrical portion 211 positioned in the lower end of the air chamber.

The ring shaped cylindrical portion 212 is constituted such that a plurality of magnetic bodies 221 are piled up in layers through respective spacers 222.

The respective magnetic bodies 221 are continuously arranged with the same poles of adjacent magnetic bodies 221 facing each other and with the respective spacers 222 therebetween. However, in the present invention, the arrangement and combination of the respective magnetic bodies 221 forming the ring shaped cylindrical portion 212 can be made in various ways and is not be limited to the one example shown in the drawings.

The vibration damping structure (A) may also be constituted as shown in FIG. 9. That is, an inner cylindrical portion 213' formed of magnetic bodies is accomodated within a fundamental outer cylindrical portion 211' formed of a magnetic material, a passage portion 214' is defined between the outer cylindrical peripheral surface of inner cylindrical portion 213' and the inner cylindrical peripheral surface of the outer cylindrical portion 211' and a magnetic fluid 215' may be stored within the fundamental outer cylindrical portion. The other constitutions including a shaft portion 216', a planar plate portion 217', a pipe portion 218', a slant portion 219', a magnetic body 221' and a spacer 222' are the same as the corresponding elements of the embodiment shown in FIG. 8.

When the present apparatus which includes the respective structural bodies (A) and (B) as constituted as mentioned above is used as a vibration proofing frame for suitable devices, the upper frame 206 for the suitable devices, etc. is positioned on the present apparatus and the lower frame 207 or a floor portion is positioned under said fundamental outer cylindrical portion 211.

With the above constitution, the function of the present apparatus will be described with reference to FIG. 8.

Firstly, regarding the vibration damping structural body (A), the arrangement of the inner peripheral surface of the ring shaped cylindrical portion 212 and the passage portion 214 creates the following state of magnetic fields. That is, since the respective magnetic bodies 221 are continuously provided in such a manner that the same poles of adjacent magnetic bodies 221 face each other through the respective spacer members 222, magnetic fields are generated in the ring shaped cylindrical portion 212 as shown in dotted lines in FIG. 10. The largest and most intensified magnetic fields 224 (black points in FIG. 10) are produced at the side portion of the respective spacers 222 and the smallest magnetic fields are produced at the center of the respective magnetic bodies 221.

Consequently, in the vibration damping structural body (A) of the apparatus of the present invention, the effect of the magnetic fluid 215 flowing through the passage 214 defined between the inner peripheral surface of the ring shaped cylindrical portion 221 and the outer peripheral surface of the inner cylindrical portion 213 can be added with that of the magnetic fields 224 in a considerably effective manner, while avoiding the formation of extremely uneven magnetic fields due to the continuous arrangement of the respective magnetic bodies 221 forming the ring shaped cylindrical portion 221. Furthermore, the apparent viscosity of the magnetic fluid 215 can be further increased by the magnetic fields 224. The apparent viscosity of the magnetic fluid 215 can be easily adjusted by condensing or diluting the magnetic fluid 215 itself.

Needless to describe specifically, the above mentioned function is equally applicable to the embodiment shown in FIG. 9.

In the present apparatus, since the slant portions 219 are formed, even if the magnetic fluid 25 is positioned on said slant poriton in FIG. 9, said magnetic fluid is always accommodated in the passage portion 214' due to the slanted surface the slant portion. Also, in the case of the embodiment shown in FIG. 8, since the magnetic fluid 25 is always attracted by the magnetic bodies 221 toward the ring shaped cylindrical portion 212, said magnetic fluid will always remain in the passage portion and will never move into the air chamber 203.

On the other hand, the elastic structural body (B) is positioned in the upper portion of the vibration damping structural body (A) as mentioned above, and serves to damp the vibration generated by suitable devices, etc. placed on the upper frame 206 at a high efficiency ratio as much as possible by means of the chamber 203 and the spring portion 202, while the air supplying and discharging of air are controlled by the pipe portion 218.

The effect of the present apparatus will be hereunder described with reference to FIG. 8. The various effects which will be described hereunder are also equally applicable to the embodiment shown in FIG. 9.

According to the third embodiment of the present equipment, the vibration generated by the devices etc. on the upper frame 206 can be damped as much as possible by means of the elastically structural body (B). In addition, the inner cylindrical portion 213 of the vibration damping structural body (A) firmly fixed to the under end of the planar plate portion 217 continuously provided in the upper central position within the air chamber 203 moves up and down in accordance with the vibration of suitable devices etc., thereby causing the magnetic fluid 215 to flow through the passage 214 with a velocity gradient. As a result, a pressure difference is produced in proportion to the average velocity of the flow on the upper and lower faces of said inner cylindrical portion 213. As a result, a further damping force is generated, thereby causing the total damping force to become much larger. By utilizing this damping force, the free vibration induced by said elastically structural body (B) etc. can be immediately damped. Furthermore, according to the present invention, by combining the magnetic fluid 215 with the respective magnetic bodies 221 as mentioned in the foregoing manner, the damping itself depending on the elastic property of the magnetic fluid 215 and the dimensions of the passage portion 214 is added with an even larger damping effect by increasing the apparent viscosity of the magnetic fluid 215 due to said intensified magnetic fields 224, and the vibration induced by the elastic structural body (B) etc. is damped instantly at a high efficiently ratio.

The damping force, as briefly mentioned above, can be easily adjusted by changing the density of the magnetic field 215 stored within the fundamental outer cylindrical portion 211. When an even larger damping force is required, it can be increased by such means as to increase the layers of the magnetic bodies 221 forming the ring shaped cylindrical portion 212 or to arrange a plurality of apparatuses of the present invention in parallel.

On the other hand, in addition to the fact that the present invention performs particularly excellent damping as mentioned in the foregoing, it also has such a character that due to the arrangement of the ring shaped cylindrical portion 212 formed of the magnetic bodies 221 piled up in several layers in the magnetic fluid 215 and also due to the intensified magnetic fields 224 generated on the inner peripheral side surface of the ring shaped cylindrical portion 212, the inner cylindrical portion 213 is always centered without contacting the inner peripheral surface of the ring shaped cylindrical portion 212 at all. Consequently, this apparatus can be referred to, in a sense, as a noncontact system damping structure. Therefore, unlike the prior art referred to in the foregoing, such difficulties as that the respectively contacted structural portions themselves become vibration mediums can be completely eliminated.

The third embodiment shown as a structural example as well as a use example of the present apparatus in FIGS. 8 through 10 is directed to a vibration proofing frame for suitable devices or the like. Consequently, when the damping apparatus according to the present invention is used as such a vibration proofing frame, the apparatus itself will never become a vibration medium and the free vibration induced by the upper or lower frame, or by the floor can be immediately damped while damping the generated vibration immediately by selecting a damping constant in advance in view of the resonant frequency of the vibration proofing frames and by preparing the magnetic fluid 215 in a suitable density of the like.

It should be understood that the present apparatus is not limited in its use to the above mentioned use. Instead, it can be used for vibration damping in various fields.

On the other hand, in the present apparatus, since the elastic structural body (B) covers the vibration damping structural body (A), the inside of said vibration damping structural body is completely sealed, thereby completely shutting out the intrusion of dusts, flakes, etc. from the outside. In addition, since evaporation of the magnetic fluid can be completely prevented, incidental unfavorable influence of evaporated magnetic fluid on the respective structural bodies of the apparatus itself, particularly on the magnetic fluid can be thoroughly eliminated.

As described in the foregoing, according to the present invention comprising a skillful combination of the magnetic bodies and the magnetic fluid, the disadvantage and the difficulties which the prior art has had can be eliminated while thoroughly solving the important problem of the prior art. Besides, since the structural portion is completely kept in a non-contact state, each part of the structure is completely free from the wear. Therefore, the expected life of the apparatus becomes long and also, since it does not completely require a special means to center the inner cylindrical portion, it does not completely require a bearing portion and so on. Further, it does not completely require sealing of the top part of the outer cylindrical portion since the outer cylindrical portion of the present invention accommodates magnetic fluid within it. It can also be applied to a variety of random induced vibrations.

What is claimed is:

1. A vibration damping apparatus for damping vibration between a first member and a second member, comprising:
    a cylinder for connection to the first member, having a closed end having a closed end surface, an open end opposite said closed end surface, and an internal surface extending in a longitudinal direction from said open end to said closed end surface;
    a piston, longitudinally movable in said cylinder in spaced noncontacting relation thereto, having a side surface opposing said internal surface and an inner end surface opposite said closed end surface, and defining a continuous space completely surrounding said piston, and a piston rod connected to said piston and extending through said open end in spaced noncontacting relation to said cylinder, for connection to a second member; and
    a magnetic fluid filling said space in contact with said internal surface, said side surface, said closed end surface, and said inner end surface;
    one of said cylinder and said piston comprising a magnetic member and the other of said cylinder and said piston comprising a nonmagnetic member, said magnetic member including a plurality of magnetic bodies arranged so as to define means for forming a magnetic field in said cylinder of maximum intensity opposite the one of said side surface and said internal surface of said one of said cylinder and said piston and so as to thereby generate an apparent increase in the viscosity of said magnetic fluid proportionally to the magnetic field intensity therein, such that longitudinal movement of said piston in said cylinder displaces said magnetic fluid therein so as to force said magnetic fluid to flow longitudinally through the portion of said space between said side surface and said internal surface at a velocity gradient relative to said magnetic member resisted by a viscous force proportional to an average velocity of said magnetic fluid relative to said magnetic member defined by said velocity gradient, and such that said magnetic fluid resists movement of said piston perpendicular to said longitudinal direction sufficently to maintain said cylinder and said piston in said spaced noncontacting relation.

2. A vibration damping apparatus as in claim 1, wherein said plurality of magnetic bodies comprises a plurality of permanent magnets successively spaced in said longitudinal direction, said permanent magnets having their north and south poles separated in said longitudinal direction and having poles of same polarity of immediately adjacent pairs of said permanent magnets facing each other.

3. A vibration damping apparatus as in claim 2, wherein said piston comprises said magnetic member.

4. A vibration damping apparatus as claim 3, wherein said internal surface and said side surface are cylindrically shaped and coaxially disposed, said permanent magnets being disk shaped and coaxially disposed.

5. A vibration damping apparatus as in claim 2, wherein said permanent magnets comprise means for forming a plurality of longitudinally spaced loops of peaked magnetic field intensity surrounding said piston in said portion of said space.

6. A vibration damping apparatus as in claim 1, wherein said internal surface and said side surface are cylindrically shaped and coaxially disposed.

7. A vibration damping apparatus as in claim 6, wherein said cylinder comprises said magnetic member, said member bodies being annularly shaped and coaxially disposed.

8. A vibration damping apparatus as in claim 1, wherein said magnetic member further includes a plurality of nonmagnetic spacer members formed in layers successively spaced in said longitudinal direction, said plurality of magnetic bodies comprising a plurality of permanent magnets successively spaced in said longitudinal direction separated by said nonmagnetic spacer members, said permanent magnets having their positive and negative poles separated in said longitudinal direction and having poles of same polarity of immediately adjacent pairs of said permanent magnets facing each other, such that a plurality of longitudinally spaced loops of peaked magnetic field intensity surround said piston in said portion of said space, directly opposite respective ones of said plurality of spacer members.

9. A vibration damping apparatus as in claim 8, wherein said internal surface and said side surface are cylindrically shaped and coaxially disposed.

10. A vibration damping apparatus as in claim 9, wherein said cylinder comprises said magnetic member, said permanent magnets and said spacer members being annularly shaped and coaxially disposed.

11. A vibration damping apparatus as in claim 10, wherein said spacer members have inner diameters less than the inner diameters of said permanent magnets.

12. A vibration damping apparatus as in claim 1, wherein said spacer members have outer diameters less than the outer diameters of said permanent magnets and greater than said inner diameters of said permanent magnets such that said permanent magnets partially overlap adjacent ones of said spacer member.

13. A vibration damping apparatus as in claim 1, further comprising spring means for elastically resisting movement of said piston with respect to said cylinder in said longitudinal direction.

14. A vibration damping apparatus as in claim 13, wherein said piston includes a connector member extending outwardly of said cylinder through said open end, said spring means comprising an elastic member fixed to said connector member and said cylinder so as to completely cover said open end and define an air chamber between said cylinder and said elastic member, thereby to define an air spring.

15. A vibration damping apparatus as in claim 1, wherein said piston comprises said magnetic member.

16. A vibration damping apparatus for damping vibration between a first member and a second member, comprising:
a cylinder for connection to the first member, having a closed end having a closed end surface, an open end opposite said closed end surface, and an internal surface extending in a longitudinal direction from said open end to said closed end surface;
a piston for connection to the second member, longitudinally movable in said cylinder in spaced noncontacting relation thereto, having a side surface opposing said internal surface and an inner end surface opposite said closed end surface, and defining a continuous space completely surrounding said piston; and
a magnetic fluid filling said space in contact, with said internal surface, said side surface, said closed end surface, and said inner end surface;
one of said cylinder and said piston comprising a magnetic member and the other of said cylinder and said piston comprising a nonmagnetic member, said magnetic member including a plurality of magnetic bodies arranged so as to define means for forming a magnetic field in said cylinder having its maximum intensity in the portion of said space between said side surface and said internal surface and so as to thereby generate an apparent increase in the viscosity of said magnetic fluid proportionally to the magnetic field intensity therein, such that longitudinal movement of said piston in said cylinder displaces said magnetic fluid therein so as to force said magnetic fluid to flow longitudinally through said portion of said space at a velocity gradient relative to said magnetic member resisted by a viscous force proportional to an average velocity of said magnetic fluid relative to said magnetic member defined by said velocity gradient, and such that said magnetic fluid resists movement of said piston perpendicular to said longitudinal direction sufficently to maintain said cylinder and said piston in said spaced noncontacting relation.

17. A vibration damping apparatus for damping vibration between a first member and a second member, comprising
a cylinder for connection to the first member, having a closed end having a closed end surface, an open end opposite said closed end surface, and an internal surface extending in a longitudinal direction from said open end to said closed end surface;
a piston for connection to the second member, longitudinally movable in said cylinder in spaced noncontacting relation thereto, having a side surface opposing said internal surface and an inner end surface opposite said closed end surface, and defining a continuous space completely surrounding said piston; and
a magnetic fluid filling said space in contact with said internal surface, said side surface, said closed end surface, and said inner end surface;
one of said cylinder and said piston comprising a magnetic member and the other of said cylinder and said pistion comprising a nonmagnetic member, said magnetic member including a plurality of magnetic bodies arranged so as to define means for forming a plurality of longitudinally spaced loops of peaked magnetic field intensity surrounding said piston in the portion of said space between said side surface and said internal surface and so as to thereby generate an apparent increase in the viscosity of said magnetic fluid proportionally to the magnetic field intensity therein, such that longitudinal movement of said piston in said cylinder displaces said magnetic fluid therein so as to force said magnetic fluid to flow longitudinally through said portion of said space at a velocity gradient relative to said magnetic member resisted by a viscous force proportional to an average velocity of said magnetic fluid relative to said magnetic member defined by said velocity gradient, and such that said magnetic fluid resists movement of said piston perpendicular to said longitudinal direction sufficiently to maintain said cylinder and said piston in said spaced noncontacting relation.

* * * * *